United States Patent
Santoemma et al.

(10) Patent No.: US 7,784,311 B2
(45) Date of Patent: Aug. 31, 2010

(54) INSTANTANEOUS MIXING DEVICE IN PARTICULAR FOR INJECTION/EXTRACTION CLEANING MACHINES WITH A PRE-SPRAY FUNCTION

(75) Inventors: Nicola Santoemma, Milan (IT); Massimiliano Santoemma, Milan (IT)

(73) Assignee: Santoemma S.r.l., Pero (Milan) (IT)

( * ) Notice: Subject to any disclaimer, the term of this patent is extended or adjusted under 35 U.S.C. 154(b) by 252 days.

(21) Appl. No.: 11/975,786

(22) Filed: Oct. 22, 2007

(65) Prior Publication Data
US 2008/0099058 A1    May 1, 2008

(30) Foreign Application Priority Data
Oct. 26, 2006  (IT) .......................... MI2006A2058

(51) Int. Cl.
*D06B 1/08* (2006.01)
(52) U.S. Cl. .......................... 68/205 R; 15/320; 15/321
(58) Field of Classification Search ............... 68/205 R; 15/320, 321
See application file for complete search history.

(56) References Cited

U.S. PATENT DOCUMENTS

| 3,181,797 | A | * | 5/1965 | Hayes .......................... 239/317 |
| 3,442,273 | A | * | 5/1969 | Hanish et al. ............. 134/100.1 |
| 3,459,334 | A | * | 8/1969 | Evans .......................... 222/132 |
| 3,773,065 | A | * | 11/1973 | Mattox ........................ 137/263 |
| 3,801,017 | A | * | 4/1974 | Jarzynski ..................... 239/310 |
| 4,207,649 | A | * | 6/1980 | Bates ........................... 15/319 |
| 4,809,397 | A | * | 3/1989 | Jacobs et al. .................. 15/320 |
| 4,993,495 | A | * | 2/1991 | Burchert ....................... 169/14 |
| 5,068,132 | A | * | 11/1991 | Brunken et al. ........... 427/421.1 |
| 5,611,462 | A | * | 3/1997 | Barkes ........................ 222/134 |
| 6,041,472 | A | * | 3/2000 | Kasen et al. ................... 15/355 |
| 6,073,300 | A | * | 6/2000 | Zahuranec et al. ............. 15/320 |
| 6,921,027 | B2 | * | 7/2005 | Firestone ....................... 239/61 |
| 7,191,489 | B1 | * | 3/2007 | Heath ............................ 15/320 |
| 7,615,122 | B2 | * | 11/2009 | Mehus et al. .................. 134/36 |
| 2003/0056812 | A1 | * | 3/2003 | Baker et al. .................... 134/36 |
| 2005/0210620 | A1 | * | 9/2005 | VanOrden et al. ............. 15/319 |
| 2006/0185113 | A1 | * | 8/2006 | Kloeppel et al. ............... 15/320 |

FOREIGN PATENT DOCUMENTS

FR  2 638 664  * 5/1990
KR  2005015986  * 2/2005

* cited by examiner

*Primary Examiner*—Frankie L Stinson
(74) *Attorney, Agent, or Firm*—Hedman & Costigan, P.C.; James V. Costigan

(57) ABSTRACT

The present invention relates to an instantaneous mixing device for injection/extraction cleaning machines and in particular to an instantaneous mixing device with a pre-spray functionality of the type equipped with at least one washing accessory (13) and/or at least one pre-washing accessory (30) connected at the outlet to a hydraulic circuit (20), the device (10) comprising:
- at least one spray pump (12) connected to the hydraulic circuit (20);
- at least one tank for water (15) and at least one tank for a chemical product (16), connected to the hydraulic circuit (20);
- at least one mixing element (14) with a Venturi effect connected downstream of the at least one water tank (15) and at least one tank for a chemical product (16).

The at least one pre-washing element (30) preferably comprises a spray hole having greater dimensions with respect to the hole of the spray nozzle of the at least one washing accessory (13).

12 Claims, 2 Drawing Sheets

INSTANTANEOUS MIXING DEVICE IN PARTICULAR FOR INJECTION/EXTRACTION CLEANING MACHINES WITH A PRE-SPRAY FUNCTION

The present invention relates to an instantaneous mixing device for injection/extraction cleaning machines and in particular an instantaneous mixing device with a pre-spray functionality.

In general, injection/extraction cleaning machines spray a solution of clean water with liquid detergent onto the surface to be cleaned, which removes the dirt, and they subsequently suck the solution from the surface, together with the dirt englobed by the same.

Conceptually, these machines consist of a hydraulic circuit for spraying the solution and a suction circuit for sucking the solution and the dirt.

The hydraulic circuit consists of tank which contains clean water and the detergent and a hydraulic pump which sprays the water and detergent solution onto the surface to be washed, with the help of connecting tubes and spray nozzles for atomizing the solution. The solution can optionally be heated by the machine in order to increase its effect against dirt.

The suction circuit is very similar to that of an industrial aspirator. A recovery tank is put in depression with respect to the atmospheric pressure outside the machine, by a suction motor. The recovery tank is connected, by means of a suction tube, to a sucking accessory which sucks the liquid from the surface to be cleaned. The depression created by the suction motor inside the recovery tank is transmitted to the sucking accessory by means of the suction tube, thus allowing the suction of water and dirt from the surface on which the accessory itself is situated. The spray nozzles of the solution can be assembled on the same sucking accessory or on a separate spraying accessory.

Injection-extraction cleaning machines are mainly used for cleaning carpets, rugs and various types of fabrics. They are also used for cleaning "hard" surfaces, such as floors or walls made of tiles, or other material. In this case the sucking accessory has rubbers on one of its ends, which allow soft contact with the surface. The sucking part of the accessory can have different shapes and dimensions, depending on the type of surface to be cleaned. An extraction machine can be supplied with several accessories to be used according to the surface to be cleaned.

In most injection cleaning machines, the spraying and suction accessory is outside the machine and is manoeuvred and directed by the user against the surfaces to be cleaned. In "compact" extraction machines the spray nozzles and the sucking mouth are positioned under the body of the machine and the operator effects the cleaning of the carpet or floor surfaces by pushing or pulling the machine on the surface.

Injection-extraction cleaning machines can also be equipped with a device, inside or outside the machine itself, which allows a mechanical brushing action, by means of one or more rotating brushes having various forms. The mechanical action on the surface to be cleaned increases the efficacy of the washing.

All injection and extraction cleaning machines, however, share the same operating principle, which consists in the spraying of a solution of water and detergent onto surfaces and in subsequent suction. In the machines currently present on the market, it is envisaged that the liquid detergent be added in a suitable quantity, together with clean water, in the specific tank.

In injection-extraction machines currently produced, the detergent is added to the clean water tank, at a dilution which depends on the detergent itself and, possibly, on the degree of dirt on the surface to be cleaned.

The hydraulic pump sucks the water and detergent solution from the tank, already mixed, and sends it downstream towards the spray nozzles.

In currently known machines, it is consequently not possible to change the concentration of the solution during their use in order to effect particular kinds of treatment, such as, for example, so-called "pre-spray", using the same machine.

In the washing of carpets and fabrics, the pre-spray of surfaces has the purpose of acting chemically on the dirt of the surfaces to be cleaned, before starting to use the injection-extraction machine. Thanks to the previous pre-spray, it is possible to improve the final cleaning result obtained with the subsequent use of the injection-extraction machine.

This treatment consists of a spraying of chemical solution onto the surfaces to be cleaned, which pre-cedes the washing effected by the injection-extraction machine.

The pre-spray is effected by means of suitable apparatuses, generally with electric or manual activation, external and independent of the injection-extraction machine. The pre-spray is effected using a more concentrated solution with respect to the solution used for the washing.

An objective of the present invention is to overcome the above-mentioned drawbacks, and in particular to provide a mixing device for injection-extraction cleaning machines which allows different dilutions of detergent in water to be obtained, according to the particular treatment.

Another objective of the present invention is to provide an instantaneous mixing device for injection-extraction cleaning machines which allows pre-spray treatment to be effected.

A further objective of the present invention is to conceive an injection-extraction washing machine which includes pre-spray equipment.

These and other objectives according to the present invention are achieved by providing an instantaneous injection-extraction mixing device as described in claim 1.

Further characteristics of the device are object of the dependent claims.

The characteristics and advantages of an instantaneous mixing device for injection-extraction machines according to the present invention, will appear more evident from the following illustrative and non-limiting description, referring to the enclosed schematic drawings in which.

Figure 1:
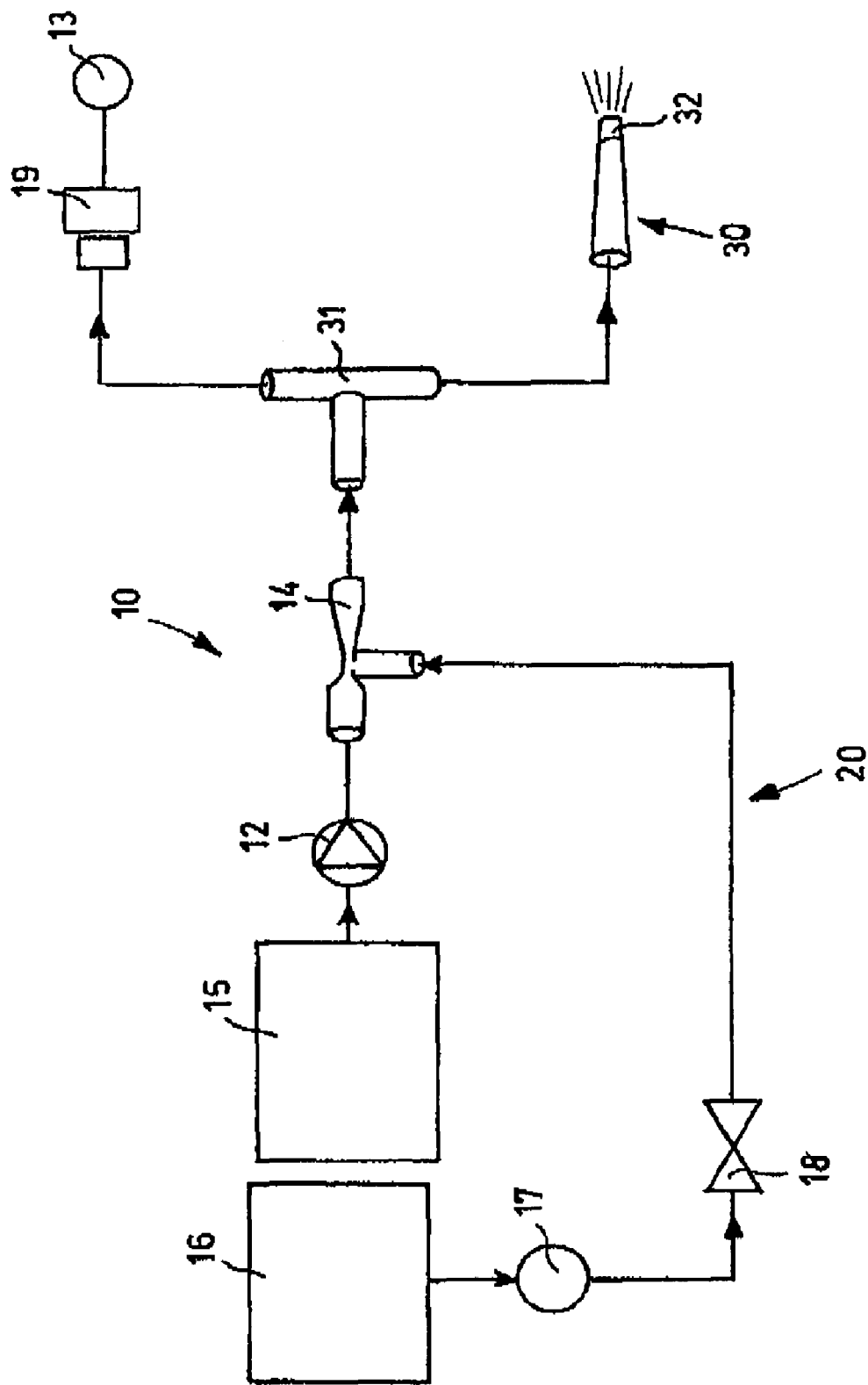
FIG. 1 is a schematic view of a first embodiment of the mixing device at different concentrations, for injection-extraction machines, according to the present invention.

With reference to the figures, these show an instantaneous mixing device, at different concentrations, for injection-extraction machines, indicated as a whole by the number 10.

The instantaneous mixing device 10 for injection-extraction machines according to the present invention, is of the type equipped with at least one washing and/or rinsing accessory 13, connected to a hydraulic circuit 20, comprising at least one spray pump 12.

According to the present invention, at least one tank for water 15 and at least one tank for the chemical product 16, for example detergent, are connected to said hydraulic circuit 20, said tanks being connected downstream to a mixing element 14, which operates according to the Venturi effect, such as, for example, a Venturi injector or a "T" connector equipped with a unidirectional system.

For the regulation of the supply of detergent from the tank 16, in order to effect the correct nominal dilution of the detergent, at least one throttle element 17, 17', is preferably envisaged downstream of said detergent tank 16 and upstream of the mixing element with a Venturi-effect 14.

In a first embodiment, the throttle element 17 for obtaining the desired nominal dilution of the detergent, is obtained by a device, called "TIP", comprising a tablet inside which there is a small hole.

Figure 2:
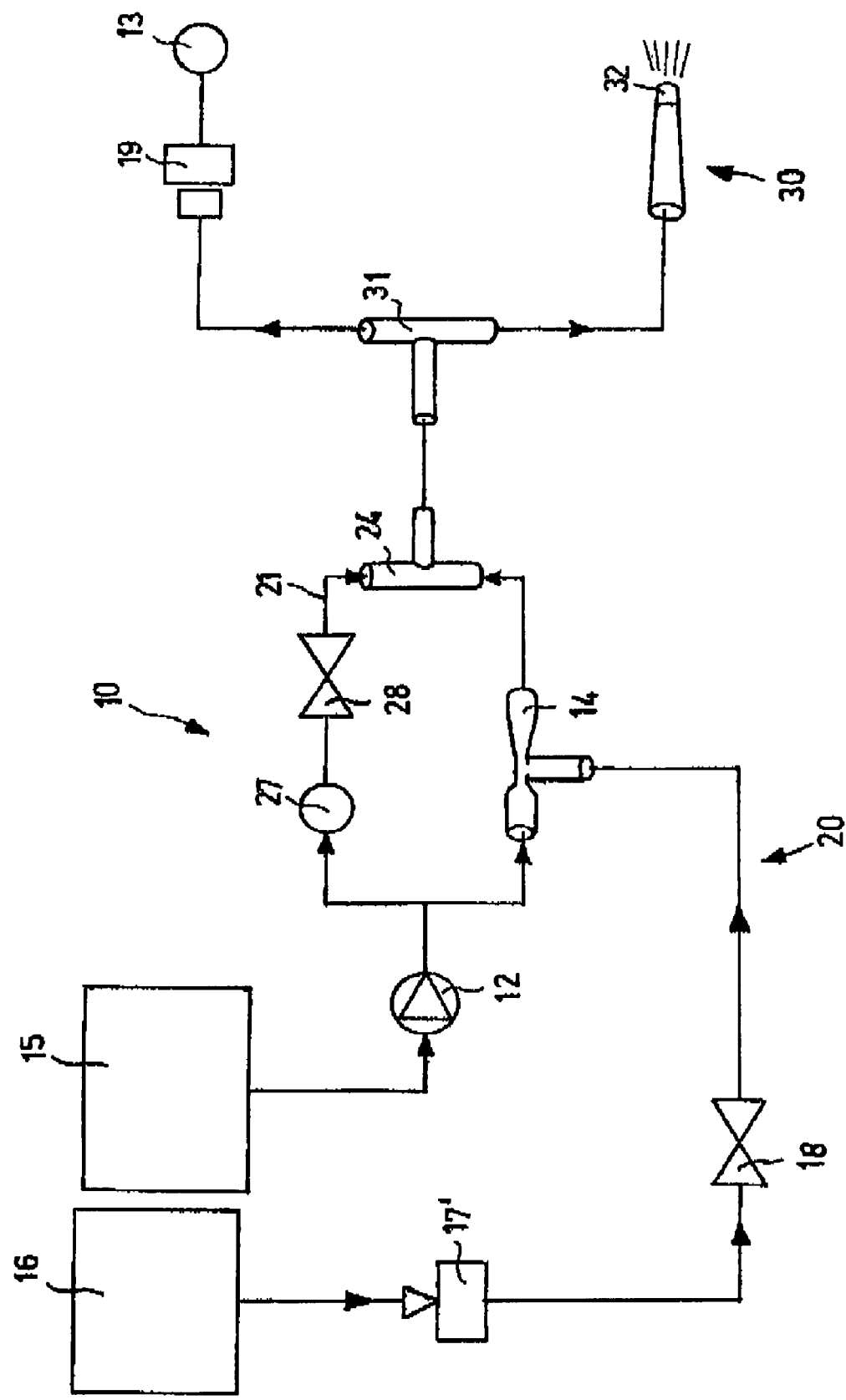
FIG. 2 is a schematic view of a second embodiment of the mixing device at different concentrations, for injection-extraction machines, according to the present invention.

Alternatively, as shown in the embodiment of FIG. 2, the throttle element consists of at least one pin tap 17'.

The dilution of the detergent in the solution is determined by the dimension of the specific hole of the throttle element and by a suitable selection of the mixing element 14.

The at least one spray pump 12 is preferably positioned between the water tank 15 and the mixing element with a Venturi effect 14, in order to suck clean water from the tank 15 and push it through the mixing element 14. The water flow through the mixing element with a Venturi effect 14, causes in the same a depression in correspondence with the detergent inlet, thus causing a sucking action from the relative tank 16. In this way, water and the chemical product are mixed inside the same mixing element 14.

The greater hydraulic friction intentionally caused by the throttle element 17 on the branch of the detergent, has an effect on the quantity of detergent sucked.

When a "TIP" 17 is used, the nominal dilution can be varied by substituting it with one having a smaller or larger hole.

An on-off valve 18 is also placed along the connecting tube between the detergent tank 16 and the mixing element 14, which can be opened or closed by the operator, to prevent or, respectively, allow the inflow of the detergent into the mixing element 14 and, therefore, the outflow circulation from the hydraulic circuit 20 of the device 10. The operator will consequently spray water and detergent mixed together or clean water alone onto the surfaces to be cleaned.

The introduction of the on-off valve 18 on the detergent branch is therefore a mechanism suitable for preventing the circulation of detergent in the circuit 20 downstream of the mixing element 14. In this way, it is possible to easily and rapidly effect a rinsing with water only.

The hydraulic circuit 20, moreover, is connected at the outlet to at least one washing/rinsing accessory 13, which can be inside, i.e. with a washing group situated under the machine, or outside, such as washing/rinsing accessories for carpets or fabric surfaces.

In this second case, the device 10 can include releasable coupling means 19 to allow the interchange of the accessory 13 in relation to the type of washing/rinsing to be effected.

In addition, the hydraulic circuit 20 is connected at the outlet to at least one pre-washing accessory, such as, for example, a special spray gun 30 for effecting the pre-spray.

The connection of the pre-washing element can be permanent, for example in parallel with the washing/rinsing accessory 13, or releasable, for example being interchangeable with the washing/rinsing element 13, through the coupling means 19.

In the case of a parallel connection, a connector 31, for example "T"-shaped, is envisaged at the outlet of the hydraulic circuit 20, for the connection of both the washing/rinsing accessory 13, and the pre-spray gun 30, said connector 31 receiving at the inlet the liquid supplied at the Outlet of the hydraulic circuit 20 and feeding, on one side, the washing/rinsing accessory 13, and on the other side the pre-spray gun 30, through the specific connecting tube.

The pre-spray gun 30 can therefore be connected directly to the machine and, if necessary, used for effecting the pre-spraying of the surfaces before washing. The pre-spray gun 30 and the connecting tube are releasably housed on the body of the machine with suitable hooking means.

In order to obtain a water/detergent concentration used for the pre-spray treatment sufficiently higher than the nominal concentration of the washing solution, the pre-spray gun 30 has a nozzle 32 with a spray-hole larger than the spray-nozzle of the washing/rinsing accessory 13, which uses the nominal washing concentration.

Thanks to the particular configuration of the mixing device 10, according to the dimensions of the spray-nozzle hole which is downstream of the hydraulic circuit 20, there is a more/less rapid water flow through the mixing element with a Venturi effect 14, and consequently a greater/lesser suction of the detergent from the relative tank 16.

The use of a nozzle 32 with larger hole in the pre-spray gun 30, automatically causes the suction of a larger quantity of detergent and consequently a higher concentration of detergent in the solution used for the pre-spray, an important characteristic for effecting an efficient pre-spray.

A pre-spray effected with a concentration equal to that normally used in the washing of fabrics would not be effective.

A dimensioning of the spray-hole of the nozzle 32 with respect to the particular mixing element with a Venturi effect 14 used, is preferably effected, so as to automatically have, during the pre-spray, a concentration of chemical product about double with respect to the nominal concentration, used during washing.

In an advantageous embodiment, which also allows the flow-rate of the solution supplied during washing and/or during pre-washing to be varied, the hydraulic circuit 20 of the mixing device 10 comprises an additional branch 21 which removes clean water from the water tank 15.

The water collected is pressurized by the spray pump 12, which is upstream of the mixing element 14, and subsequently flows into a second mixing element 24, preferably "T"-shaped, thus joining the solution leaving the mixing element 14.

A second on-off valve 28 and a second throttle element 27 for regulating the maximum quantity of water which can circulate through the branch itself 21, are envisaged along the additional branch 21 of the hydraulic circuit 20.

By opening the second on-off valve 28, at the outlet of the circuit 20, there is an increase in the flow-rate of the water-chemical product solution, and a contemporaneous decrease in its concentration. Vice versa, with the tap closed, there will be a reduced flow-rate of a solution with a higher concentration.

In this particular embodiment, the elements of the circuit 20 are intentionally dimensioned so as to have a concentration of the detergent which is higher than the nominal concentration of the solution used for the washing when the flow-rate is lower.

In this way, a good washing efficacy is guaranteed notwithstanding the reduced flow-rate.

Similarly, the dimensioning is such as to guarantee a concentration of detergent equal to the nominal concentration when the flow-rate is higher.

The additional branch 21 allows a further increase in the concentration of the solution used in the pre-washing phase, by simply acting on the second on-off valve 28 or, for a more accurate regulation, the second throttle element 27.

The effect of the increase in concentration in the solution due to the use of a pre-washing accessory 30 with a larger spray-hole is in fact added to the effect of the increase in concentration following the reduction in the flow-rate.

The device 10, according to the present invention, can be integrated with the machine or it can be produced as a kit which can be assembled on any injection-extraction cleaning machine already existing, without requiring any constructive modification. It is in fact sufficient to remove the water filter from the machine and to connect in its place the outflow of the mixing element 14.

The mixing element can be positioned inside the tank of the machine, or outside, according to the most convenient position.

The production of the device as a kit to be installed in an already existing machine allows both the producer and the seller of this type of machine to keep standard machines in storage, without the mixing device object of the present invention, and several kits comprising said device 10.

The seller can install the device 10 on the machine at the moment of selling if the client requires the machine with the device. In this way, storage is reduced, at the production site and in the distribution centres, avoiding having both standard machines and machines with the device assembled.

Furthermore, even if the instantaneous mixing in the present description is effected by means of a single pump 12, the suction of water and detergent can also take place, still remaining within the protection scope of this invention, with the help of one or more additional pumps, one or more of these pumps possibly being destined for the specific suction of the detergent.

The characteristics of the device, object of the present invention, are evident from the above description, as also the relative advantages.

In particular, by using this device, it is possible to connect a pre-spray gun directly to the injection/extraction cleaning machine, automatically obtaining the supply of more concentrated solution.

This eliminates the necessity of carrying specific equipment for this treatment, as normally happens when a concentrated solution is to be sprayed before the washing.

The device is in fact capable of automatically feeding the pre-spray gun with a water and detergent solution at a higher concentration with respect to the solution fed to the washing accessories.

Furthermore, this device offers the possibility of rapidly and simply effecting a rinsing with water only by closing the appropriate valve 18. It is currently necessary to empty the tank of the solution in order to carry out a rinsing, with a consequent waste of the detergent contained in the solution itself. With the device, object of the present patent, on the contrary, there is no waste, as the detergent is mixed with water according to necessity.

In addition, the device according to the invention, depending on the particular embodiment, offers the possibility of varying the flow-rate of the solution supplied, by generating an opposite variation of the concentration of said solution. It is therefore possible to effect maintenance washings at a low flow-rate, but with the same efficacy due to the high concentration of the solution used.

Finally, the device thus conceived can obviously undergo various modifications and variations, all included in the invention; furthermore all the details can be substituted by technically equivalent elements. In practice, the materials used, as also the dimensions, can vary according to technical requirements.

The invention claimed is:

1. An instantaneous mixing device (10) for injection/extraction cleaning machines of the type equipped with at least one washing accessory (13) and/or at least one pre-washing accessory (30) connected to the outlet of a hydraulic circuit (20), said device (10) comprising:
   at least one tank for water (15) and at least one tank for a detergent product (16), connected to said hydraulic circuit (20)said one tank comprising:
   at least one spray pump (12):
   at least one mixing element (14) with a Venturi effect connected downstream of said at least one water tank (15) and at least one tank for a detergent (16), wherein said spray pump (12) is positioned downstream of said water tank(15) and upstream of said at least one mixing element (14):
   at least one throttle element (17, 17') for effecting the nominal dilution of the detergent, situated upstream of said at least one mixing element (14);
   at least one on-off valve (18) to prevent the circulation of the detergent in the circuit (20), downstream of said at least one mixing element (14);
   an additional branch (21) for the collection of water from said at least one water tank (15) and the introduction of said collected water downstream of said at least one mixing element (14), wherein said additional branch (21) is adapted to regulate the flow-rate of the solution supplied and a second on-off valve (28) for preventing the circulation downstream of said additional branch (21).

2. The device (10) according to claim 1, characterized in that said at least one pre-washing accessory (30) comprises a spray-hole having larger dimensions with respect to the hole of the spray-nozzle of said at least one washing accessory (13).

3. The device (10) according to claim 1, characterized in that said at least one washing accessory (13) and at least one pre-washing accessory (30) are connected to said mixing device (14) by means of a connection element (31).

4. The device (10) according to claim 1, characterized in that said at least one pre-washing accessory (30) is a spray gun for effecting the pre-spray.

5. The device (10) according to claim 1, characterized in that said at least one throttle element for effecting the nominal dilution of the detergent comprises at least one tap (17').

6. The device according to claim 1, characterized in that a second connection element (24) envisaged downstream of said additional branch (21).

7. The device (10) according to claim 1, characterized in that it comprises releasable coupling means (19) for said at least one washing accessory (13).

8. The device (10) according to claim 1, characterized in that it is produced as an installation "Kit".

9. The device (10) according to claim 1, characterized in that said mixing element (14) is a Venturi injector.

10. An injection/extraction cleaning machine, characterized in that it comprises a device (10) according to claim 1.

11. The machine according to claim 10, characterized in that it comprises a connecting tube of said spray gun (30) to said machine.

12. The machine according to claim 11, characterized in that it comprises means for the releasable connection to said machine of said spray gun (30) and said connecting tube.

* * * * *